(12) United States Patent
Iwaguchi et al.

(10) Patent No.: US 12,386,129 B2
(45) Date of Patent: Aug. 12, 2025

(54) OPTICAL FIBER RIBBON

(71) Applicant: SUMITOMO ELECTRIC INDUSTRIES, LTD., Osaka (JP)

(72) Inventors: Noriaki Iwaguchi, Osaka (JP); Takashi Fujii, Osaka (JP); Fumiaki Sato, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 195 days.

(21) Appl. No.: 18/249,296

(22) PCT Filed: Oct. 15, 2021

(86) PCT No.: PCT/JP2021/038299
§ 371 (c)(1),
(2) Date: Apr. 17, 2023

(87) PCT Pub. No.: WO2022/085598
PCT Pub. Date: Apr. 28, 2022

(65) Prior Publication Data
US 2024/0027715 A1 Jan. 25, 2024

(30) Foreign Application Priority Data
Oct. 19, 2020 (JP) ................................ 2020-175368

(51) Int. Cl.
*G02B 6/44* (2006.01)
(52) U.S. Cl.
CPC .................. *G02B 6/4403* (2013.01)
(58) Field of Classification Search
CPC .................................. G02B 6/4403
USPC ....................................... 385/114
See application file for complete search history.

(56) References Cited

U.S. PATENT DOCUMENTS

| 5,524,164 A | 6/1996 | Hattori et al. |
| 2014/0112631 A1* | 4/2014 | Namazue ................. G02B 6/44 29/428 |
| 2017/0153402 A1 | 6/2017 | Chiasson et al. |
| 2018/0031792 A1* | 2/2018 | Risch .................... G02B 6/448 |

(Continued)

FOREIGN PATENT DOCUMENTS

| CN | 111175887 A1 | 5/2020 |
| JP | H06-265737 A | 9/1994 |
| JP | H09-197209 A | 7/1997 |

(Continued)

OTHER PUBLICATIONS

International Search Report dated Dec. 28, 2021 issued in PCT/JP2021/038299.
Written Opinion dated Dec. 28, 2021 issued in PCT/JP2021/038299.

*Primary Examiner* — Jerry M Blevins
(74) *Attorney, Agent, or Firm* — MCDONALD HOPKINS LLC

(57) ABSTRACT

An optical fiber ribbon includes a plurality of optical fibers arranged in parallel in a direction orthogonal to a longitudinal direction of the optical fibers, and a collective coating covering outer peripheries of the plurality of optical fibers. The collective coating includes a connected portion at which the optical fibers adjacent to each other are connected in at least a part of the plurality of optical fibers. An outer diameter of each of the plurality of optical fibers is 215 μm or less, and a dynamic friction force of the collective coating is 0.3 N or less.

5 Claims, 11 Drawing Sheets

(56) References Cited

U.S. PATENT DOCUMENTS

2019/0293891 A1    9/2019  Hurley et al.
2022/0269023 A1*  8/2022  Kaneko .................. G02B 6/448

FOREIGN PATENT DOCUMENTS

| JP | H09-258074 A | 10/1997 |
|---|---|---|
| JP | 2001-166189 A | 6/2001 |
| JP | 2014-238480 A | 12/2014 |
| JP | 2019-168553 A | 10/2019 |

* cited by examiner

OPTICAL FIBER RIBBON

TECHNICAL FIELD

The present disclosure relates to an optical fiber ribbon. The present application claims the benefit of priority of Japanese Patent Application No. 2020-175368, filed on Oct. 19, 2020, the content of which is incorporated herein by reference.

BACKGROUND ART

In recent years, there is an increasing demand to increase a density of an optical fiber cable. As an example of increasing the density, it is known to reduce an outer diameter of an optical fiber to be mounted in the optical fiber cable or to use a plurality of optical fibers having different outer diameters. Further, in order to improve workability and identifiability at the time of splicing, there is known an optical fiber ribbon in which a plurality of optical fibers are arranged in parallel and integrally coated (Patent Literature 1).

CITATION LIST

Patent Literature

Patent Literature 1: JP2014-238480A

SUMMARY OF INVENTION

An optical fiber ribbon according to the present disclosure includes:
- a plurality of optical fibers arranged in parallel in a direction orthogonal to a longitudinal direction of the optical fibers; and
- a collective coating covering outer peripheries of the plurality of optical fibers,
- the collective coating includes a connected portion at which the optical fibers adjacent to each other are connected in at least a part of the plurality of optical fibers,
- an outer diameter of each of the plurality of optical fibers is 215 µm or less, and
- a dynamic friction force of the collective coating is 0.3 N or less.

DESCRIPTION OF EMBODIMENTS

Technical Problem

Figure 1:
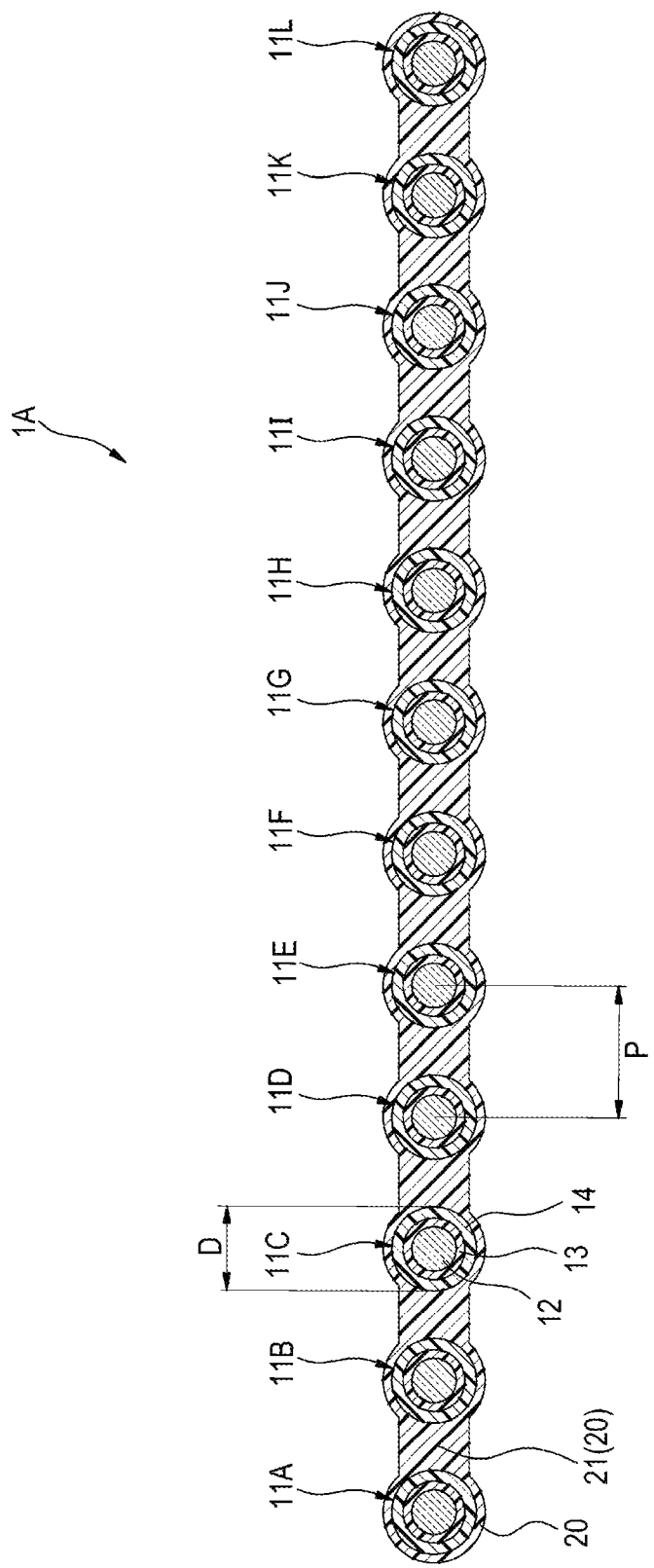
FIG. 1 is a cross-sectional view of an optical fiber ribbon according to a first embodiment of the present disclosure.

In a case where the optical fiber ribbons are mounted in the optical fiber cable at a high density, since the optical fibers tend to be in contact with each other, friction may occur between the optical fibers. When the friction occurs non-uniformly in a longitudinal direction of the cable, the cable tends to meander. Further, transmission characteristics of the cable at a low temperature tend to deteriorate. In particular, in a case where outer diameters of the plurality of optical fibers are different, the cable is more likely to meander, and the transmission characteristics are more likely to deteriorate.

The present disclosure is to provide an optical fiber ribbon that enables high-density mounting of optical fibers in an optical fiber cable and prevents occurrence of cable meandering.

(Description of Aspect of Present Disclosure)

First, an embodiment of the present disclosure will be listed and described.

(1) An optical fiber ribbon according to an aspect of the present disclosure includes:
- a plurality of optical fibers arranged in parallel in a direction orthogonal to a longitudinal direction of the optical fibers; and
- a collective coating covering outer peripheries of the plurality of optical fibers,
- the collective coating includes a connected portion at which the optical fibers adjacent to each other are connected in at least a part of the plurality of optical fibers,
- an outer diameter of each of the plurality of optical fibers is 215 µm or less, and
- a dynamic friction force of the collective coating is 0.3 N or less.

According to the present disclosure, since the dynamic friction force of the collective coating of the optical fiber ribbon is 0.3 N or less, friction generated between the optical fiber ribbons adjacent to each other can be reduced. Accordingly, even when the optical fiber ribbons are mounted in the cable at a high density, cable meandering can be prevented. Further, transmission characteristics of the cable at a low temperature can be ensured.

Since the outer diameter of each optical fiber of the optical fiber ribbon of the present disclosure is 215 µm or less, the optical fiber ribbons can be mounted in a cable at a high density.

(2) A surface hardness of the collective coating may be 1.2 GPa or more and 3 GPa or less.

According to the present disclosure, since the surface hardness of the collective coating is 1.2 GPa or more and 3 GPa or less, meandering generated between the optical fiber ribbons adjacent to each other can be reduced. Accordingly, even when the optical fiber ribbons are mounted in the cable at a high density, the cable meandering can be prevented. Further, the transmission characteristics of the cable at a low temperature can be ensured.

(3) A distance between centers of the optical fibers adjacent to each other may be 220 μm or more and 280 μm or less.

According to the present disclosure, since the distance between the centers of the optical fibers adjacent to each other is 220 μm or more and 280 μm or less, a general splicing device can be used. Even if each of the optical fibers is small in diameter, it is not necessary to prepare a dedicated splicing device for small-diameter optical fibers, so that a versatile optical fiber ribbon can be provided.

(4) The collective coating may include a non-connected portion at which the optical fibers adjacent to each other are not connected in at least a part of the plurality of optical fibers.

The connected portion may be formed intermittently in the longitudinal direction. According to the present disclosure, since the non-connected portion is provided intermittently in the longitudinal direction, the optical fiber ribbon is easily deformed in a cross section perpendicular to the longitudinal direction. Accordingly, the optical fibers can be mounted in the optical fiber cable at a high density.

(5) In a cross-sectional view of each of the optical fibers, the collective coating may include a thick portion and at least two thin portions in each of which a thickness of the collective coating is smaller than the thickness of the collective coating in the thick portion.

A difference between the thickness of the collective coating in the thick portion and the thickness of the collective coating in each of the thin portions may be 5 μm or more and 19 μm or less.

In the optical fiber ribbon of the present disclosure, the collective coating includes the thick portion and at least two thin portions, and the thickness of the collective coating is non-uniform. In particular, since the difference between the thickness of the collective coating in the thick portion and the thickness of the collective coating in each of the thin portions is as relatively large as 5 μm or more and 19 μm or less, a contact area between the optical fiber ribbons can be reduced. Therefore, friction is unlikely to occur between the optical fiber ribbons adjacent to each other, and even when the optical fiber ribbons are mounted in a cable at a high density, the cable meandering can be further prevented.

(6) The plurality of optical fibers may include a first optical fiber having a first outer diameter and a second optical fiber having a second outer diameter.

According to the present disclosure, since the plurality of optical fibers include the first optical fiber having the first outer diameter and the second optical fiber having the second outer diameter, the optical fibers can be mounted in the optical fiber cable at a high density while reducing the cable meandering.

Advantageous Effects of Invention

According to the present disclosure, an optical fiber ribbon that enables high-density mounting of the optical fibers in the optical fiber cable and prevents occurrence of cable meandering can be provided.

(Details of First Embodiment of Present Disclosure)

Specific examples of an optical fiber ribbon according to a first embodiment of the present disclosure will be described with reference to the drawings.

The present disclosure is not limited to these examples and is defined by the scope of the claims, and is intended to include all modifications within the scope and meaning equivalent to the scope of the claims.

FIG. 1 is a cross-sectional view perpendicular to a longitudinal direction of an optical fiber ribbon 1A according to an embodiment of the present disclosure. As shown in FIG. 1, the optical fiber ribbon 1A includes a plurality of optical fibers 11 and a collective coating 20 that covers the plurality of optical fibers 11. In this example, 12 optical fibers 11A to 11L are arranged in parallel in a direction orthogonal to the longitudinal direction of the optical fiber ribbon 1A. The plurality of optical fibers 11 are arranged at regular intervals. Outer peripheries of the plurality of optical fibers 11 are covered with the collective coating 20, and the entire optical fibers 11 are connected by the collective coating 20.

An outer diameter D of each of the plurality of optical fibers 11 is 215 μm or less. In this example, the outer diameter D of each optical fiber is 200 μm. Each optical fiber 11 includes, for example, a glass fiber 12 including a core and a cladding, a primary resin layer 13 covering an outer periphery of the glass fiber 12, and a secondary resin layer 14 covering an outer periphery of the primary resin layer 13. The glass fiber 12 may include pure silica glass, silica glass doped with germanium, or silica glass doped with fluorine. The primary resin layer 13 may include a soft material having a relatively low Young's modulus, as a buffer layer. The secondary resin layer 14 may include a hard material having a relatively high Young's modulus, as a protective layer.

The Young's modulus of the primary resin layer 13 at 23° C. is preferably 0.04 MPa or more and 0.8 MPa or less, more preferably 0.05 MPa or more and 0.7 MPa or less, and still more preferably 0.05 MPa or more and 0.6 MPa or less. Since the Young's modulus of the primary resin layer 13 is 0.04 MPa or more and 0.8 MPa or less, voids are less likely to be generated in the optical fiber. The Young's modulus of the secondary resin layer 14 at 23° C. is preferably 900 MPa or more, more preferably 1000 MPa or more, and still more preferably 1200 MPa or more. The Young's modulus of the secondary resin layer 14 at 23° C. may be 3000 MPa or less, 2500 MPa or less, 2000 MPa or less, or 1800 MPa or less. Since the Young's modulus of the secondary resin layer 14 is 900 MPa or more, lateral pressure resistance is likely to be improved. When the Young's modulus of the secondary resin layer 14 is 3000 MPa or less, the secondary resin layer 14 has appropriate elongation at break, so that stripping is easily performed.

The collective coating 20 includes connected portions 21 at each of which adjacent optical fibers are connected in at least a part of the plurality of optical fibers 11. In this example, the connected portion 21 is disposed between all adjacent optical fibers. The connected portions 21 are arranged such that a distance P between centers of adjacent optical fibers is 220 μm or more and 280 μm or less.

The collective coating 20 may contain, for example, an ultraviolet curable resin. A dynamic friction force of the collective coating 20 is 0.3 N or less. Further, a surface hardness of the collective coating 20 is 1.2 GPa or more and 3 GPa or less. A Young's modulus of the collective coating 20 at 23° C. is preferably 50 MPa or more and 900 MPa or less, and more preferably 100 MPa or more and 800 MPa or less, from the viewpoint of lateral pressure resistance and flexibility of the optical fiber ribbon.

Figure 2:
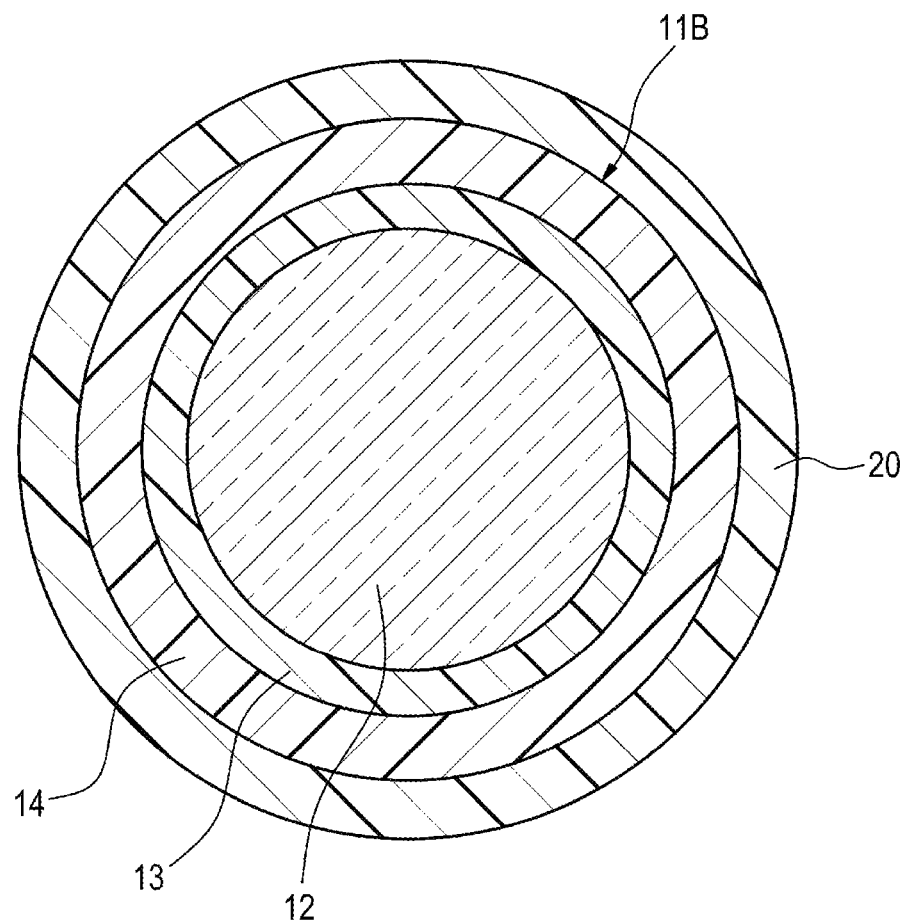
FIG. 2 is a cross-sectional view of an optical fiber of the optical fiber ribbon shown in FIG. 1.

FIG. 2 is a cross-sectional view of one optical fiber 11B among the plurality of optical fibers 11 included in the optical fiber ribbon 1A shown in FIG. 1. Since configurations of other optical fibers 11A and 11C to 11L are the same as the configuration of the optical fiber 11B shown in FIG. 2, repeated description will be omitted.

As shown in FIG. 2, in the cross-sectional view of the optical fiber 11B, the collective coating 20 covers the entire outer periphery of the optical fiber 11B, so that there is no location where the optical fiber 11B is exposed from the collective coating 20. In other words, the thickness of the collective coating 20 is uniform on the outer periphery of the optical fiber cable 11B. The thickness of the collective coating 20 is, for example, 20 μm or less. In this example, the thickness of the collective coating between the optical fiber 11B and the optical fiber 11A or 11C refers to a thickness excluding the connected portion 21.

Figure 3:
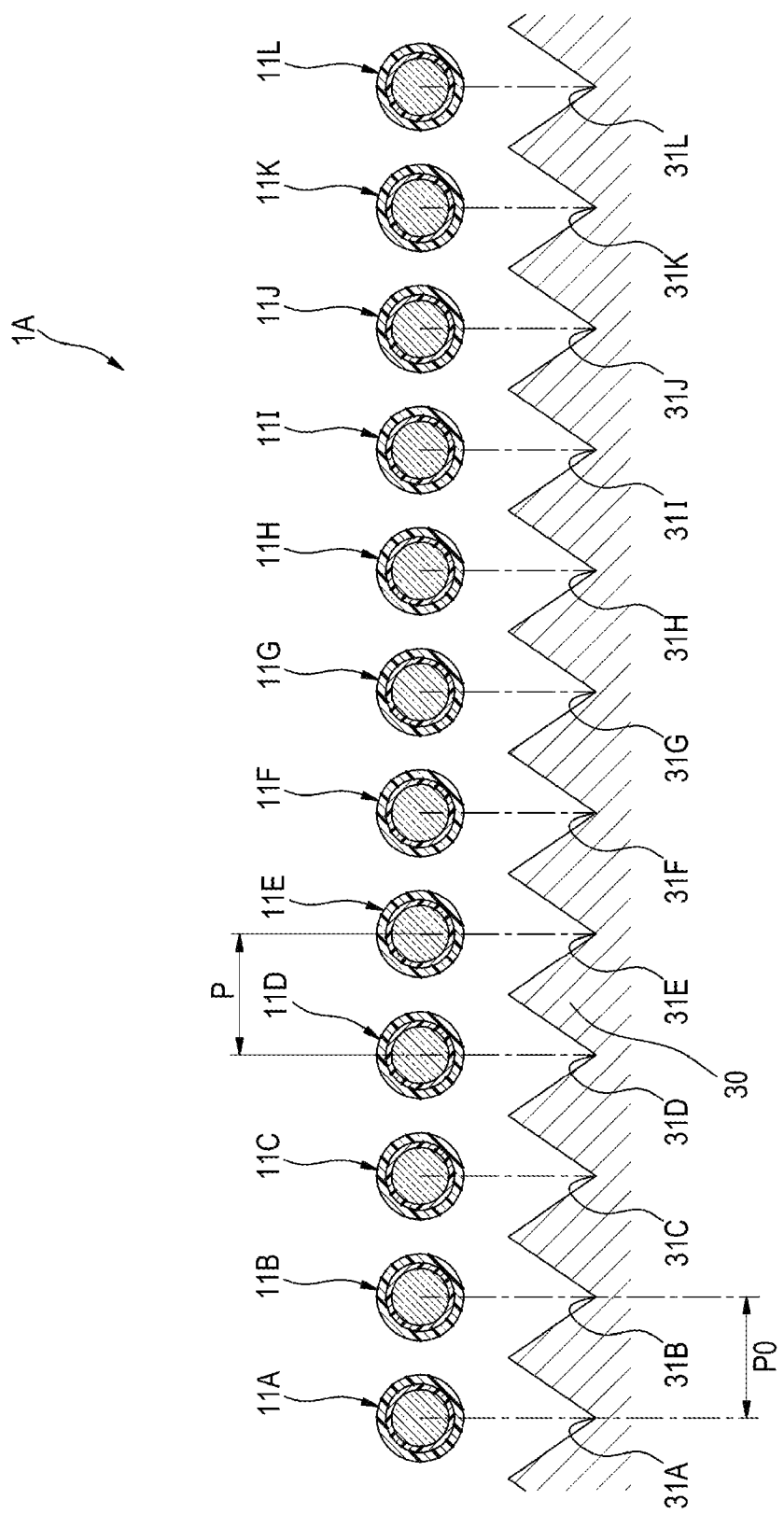
FIG. 3 is a schematic view showing a relationship between a pitch of the optical fiber ribbon according to the first embodiment and V-grooves of a fusion machine in a fusion step.

Next, fusion splicing of the optical fiber ribbon 1A will be described. In general, in a case of splicing an optical fiber ribbon and another optical fiber ribbon, a plurality of optical fibers can be wholly fusion-spliced by using optical fiber fusion splicer (not shown). FIG. 3 is a schematic view showing a relationship between a pitch of the optical fiber ribbon 1A (a distance P between centers of adjacent optical fibers) and a V-groove base 30 of a fusion machine. As shown in FIG. 3, the fusion splicer includes the V-groove base 30 including a plurality of V-grooves 31 in which the plurality of optical fibers 11 are arranged. In this example, the 12 optical fibers 11A to 11L are respectively arranged in 12 V-grooves 31A to 31L. A pitch P0 of the V-grooves 31A to 31L is 250 μm according to an international standard of an outer diameter of the optical fiber.

At the time of fusion-splicing, the optical fibers 11A to 11L in a state where the collective coating 20 is stripped are arranged above the V-groove base 30. The optical fibers 11A to 11L are arranged such that, for example, center positions of the V grooves 31A to 31L in a parallel arrangement direction and center positions of the optical fibers 11A to 11L in a parallel arrangement direction are aligned. In this state, a clamp cover (not shown) of the fusion splicer is closed, and the optical fibers 11A to 11L are pushed down from above by the clamp cover.

If there is no connected portion in the optical fiber ribbon and a distance between adjacent optical fibers among the optical fibers is zero, the distance between the centers is smaller than the pitch P0 of the V-grooves 31A to 31L. In this case, the plurality of optical fibers are arranged to be gathered toward a center position of the V-groove base 30, and are not arranged to face the V-grooves 31A to 31L. Accordingly, the plurality of optical fibers are not necessarily accommodated in the V-grooves 31A to 31L, respectively, and for example, a case where the optical fibers are not accommodated in the V-grooves 31A and 31L occurs. This may also occur in a case where the distance P between the centers of adjacent optical fibers is less than 220 μm.

On the other hand, in the optical fiber ribbon 1A in this example, since the connected portions 21 are arranged such that the distance P between the centers of adjacent optical fibers is 220 μm or more and 280 μm or less, the optical fibers 11A to 11L are arranged to face the V-grooves 31A to 31L respectively. Therefore, when the optical fibers 11A to 11L are pushed down substantially vertically, the optical fibers 11A to 11L are accommodated in the V-grooves 31A to 31L respectively.

FIG. 3 shows that the optical fibers 11A to 11L in a state where the collective coating 20 is stripped are to be accommodated in the V-grooves 31A to 31L respectively, but for example, the primary resin layer 13 and the secondary resin layer 14 may be further stripped in addition to the collective coating 20, and only the glass fiber 12 may be accommodated in each of the V-grooves 31A to 31L.

As described above, in the optical fiber ribbon 1A according to this example, since the dynamic friction force of the collective coating 20 is 0.3 N or less, friction between adjacent optical fiber ribbons can be reduced. Even when a plurality of optical fiber ribbons 1A are mounted in an optical fiber cable at a high density, friction between adjacent optical fiber ribbons 1A is reduced, so that cable meandering can be prevented, and cable laying work can be improved.

In the optical fiber ribbon 1A of this example, the collective coating 20 covers the outer peripheries of the plurality of optical fibers. If the outer periphery of any optical fiber 11 is not completely covered with the collective coating 20 and there is a portion exposed from the collective coating 20, the collective coating 20 may be peeled off from the optical fiber 11 starting from the exposed portion, and as a result, the optical fiber 11 may be single core-separated from the optical fiber ribbon. However, in this example, since the outer peripheries of the plurality of optical fibers are covered with the collective coating 20, the single core-separation does not occur.

Since the outer diameter of each optical fiber 11 of the optical fiber ribbon 1A of this example is 215 μm or less, a cross-sectional area of the optical fiber 11 is small, and the optical fiber ribbons 1A can be mounted in an optical fiber cable at a high density.

In the optical fiber ribbon 1A of this example, since the surface hardness of the collective coating 20 is 1.2 GPa or more and 3 GPa or less, friction generated between adjacent optical fibers can be reduced. Accordingly, even when the optical fiber ribbons are mounted in the cable at a high density, the cable meandering can be prevented, and the cable laying work can be improved. Further, transmission characteristics of the cable at a low temperature can be ensured.

In this example, since the distance between the centers of adjacent optical fibers is 220 μm or more and 280 μm or less, the optical fiber ribbon can be used in a general multi-core fusion machine or splicing device. Even if each of the optical fibers 11 is small in diameter, it is not necessary to prepare a multi-core fusion machine dedicated to small diameter fiber, such as a multi-core fusion machine in which V-grooves are formed at a narrow pitch, so that the versatility of the optical fiber ribbon 1A is high and the manufacturing cost can be reduced.

(First Modification)

Figure 4:
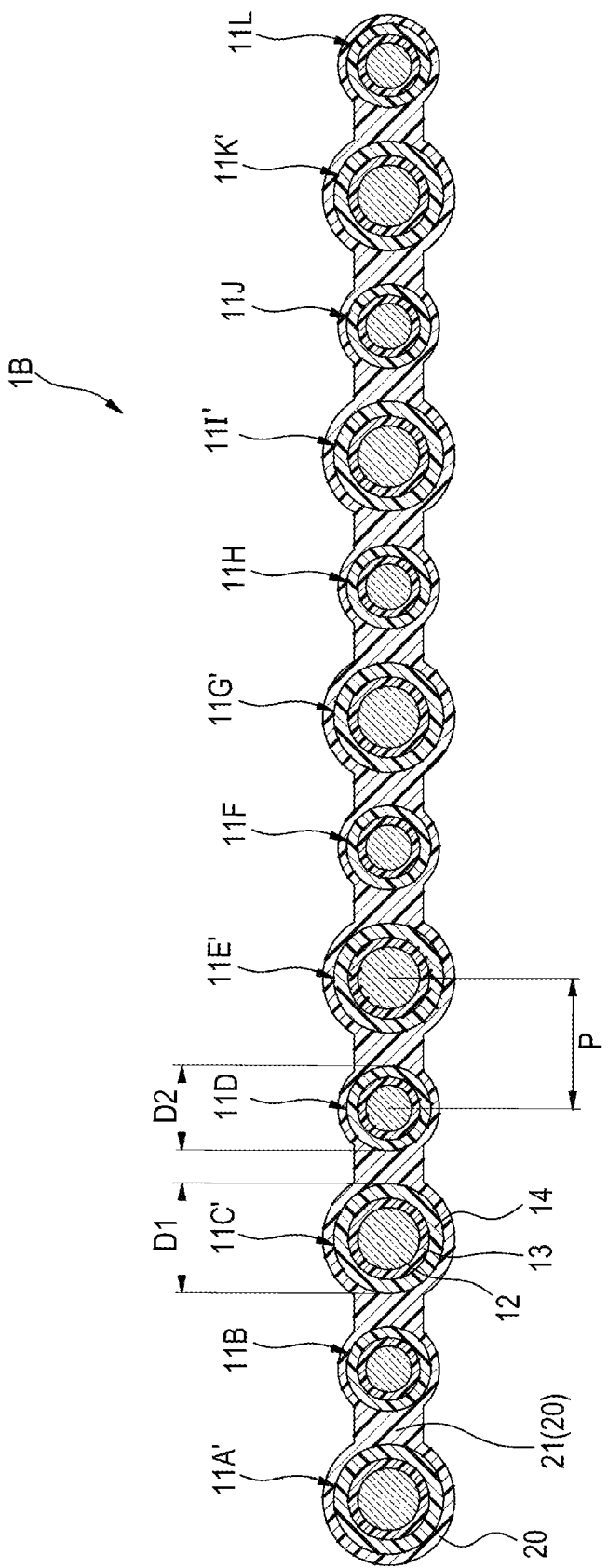
FIG. 4 is a cross-sectional view of an optical fiber ribbon according to a first modification.

In the optical fiber ribbon 1A according to the first embodiment, the outer diameters of the optical fibers 11 are all the same, but the outer diameters of the optical fibers 11 may not be the same. FIG. 4 is a cross-sectional view perpendicular to a longitudinal direction of an optical fiber ribbon 1B according to a first modification. In the description of FIG. 4, elements substantially the same as or corresponding to those in the configuration shown in FIG. 1 are denoted by the same reference numerals, and repeated description thereof will be omitted.

As shown in FIG. 4, the plurality of optical fibers 11 of the optical fiber ribbon 1B include first optical fibers each having an outer diameter D1 (an example of a first outer diameter), and second optical fibers each having an outer diameter D2 (an example of a second outer diameter). In this example, the outer diameter D1 of the first optical fibers 11A', 11C', 11E', 11G', 11I', and 11K' is different from the outer diameter D2 of the second optical fibers 11B, 11D, 11F, 11H, 11J, and 11L, and the first optical fibers each having the outer diameter D1 and the second optical fibers each having the outer diameter D2 are alternately arranged. The outer diameter D1 of the first optical fiber and the outer diameter D2 of the second optical fiber are both 215 µm or less. In this example, the outer diameter D1 is 200 µm, and the outer diameter D2 is 180 µm. Each of the first optical fibers 11A', 11C', 11E', 11G', 11I', and 11K' includes the glass fiber 12, the primary resin layer 13, and the secondary resin layer 14. Further, when the outer diameters D1 and D2 are different from each other, the connected portions 21 of the collective coating 20 are also arranged such that the distance P between the centers of adjacent optical fibers is 220 µm or more and 280 µm or less.

When the optical fiber ribbon 1B according to the first modification is mounted in an optical fiber cable, the second optical fibers 11B, 11D, 11F, 11H, 11J, and 11L each having the small outer diameter D2 are disposed in gaps between the first optical fibers 11A', 11C', 11E', 11G', 11I', and 11K' each having the large outer diameter D1. Accordingly, as compared with a case where the plurality of optical fibers 11 have the same outer diameter, a mounting density of the optical fibers 11 with respect to the optical fiber cable is higher in a case where the plurality of optical fibers 11 have the outer diameters D1 and D2 different from each other.

As described above, since the optical fiber ribbon 1B according to the first modification includes the plurality of optical fibers 11 including the first optical fibers each having the outer diameter D1, and the second optical fibers each having the outer diameter D2, the optical fibers 11 can be mounted in the optical fiber cable at a higher density.

(Second Modification)

Figure 5:
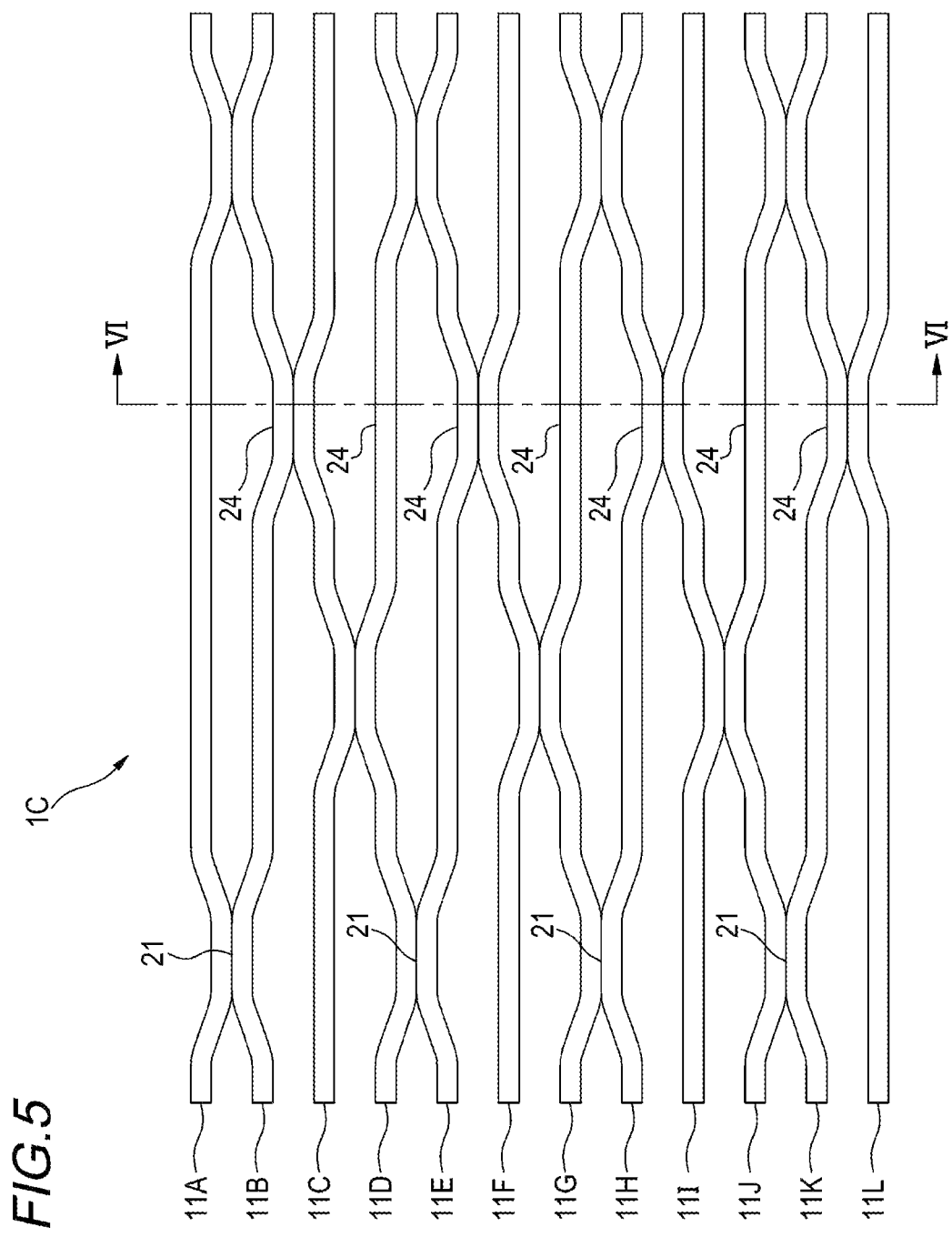
FIG. 5 is a view showing a part of an optical fiber ribbon according to a second modification in a longitudinal direction of the optical fiber ribbon.
Figure 6:
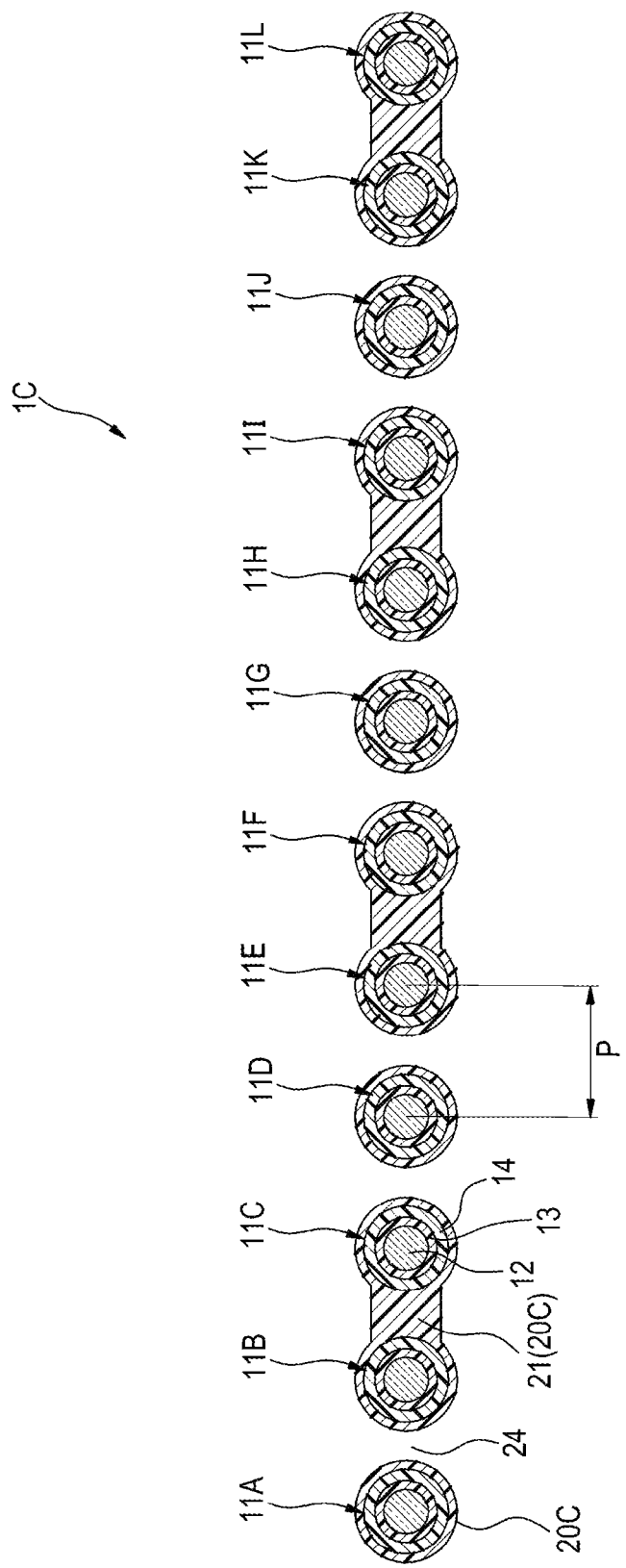
FIG. 6 is a cross-sectional view of the optical fiber ribbon shown in FIG. 5.

The connected portions 21 of the optical fiber ribbon 1A according to the first embodiment connect all adjacent optical fibers, but the arrangement of the connected portions is not limited thereto. FIG. 5 is a view showing a part of an optical fiber ribbon 1C according to a second modification in a longitudinal direction of the optical fiber ribbon 1C. FIG. 6 is a cross-sectional view of the optical fiber ribbon 1C. In the description of FIG. 6, elements substantially the same as or corresponding to those in the configuration shown in FIG. 1 are denoted by the same reference numerals, and repeated description thereof will be omitted.

As shown in FIGS. 5 and 6, a collective coating 20C of the optical fiber ribbon 1C includes non-connected portions 24 at each of which adjacent optical fibers are not connected in at least a part of the plurality of optical fibers 11. In other words, FIGS. 5 and 6 show the optical fiber ribbon 1C including the non-connected portions 24. In the second modification, the non-connected portions 24 are formed between the optical fibers 11A and 11B, between the optical fibers 11C and 11D, between the optical fibers 11D and 11E, between the optical fibers 11F and 11G, between the optical fibers 11G and 11H, between the optical fibers 11I and 11J, and between the optical fibers 11J and 11K. The arrangement positions of the non-connected portions 24 shown in FIG. 6 is an example, and is not limited thereto. The non-connected portions 24 are intermittently formed in the longitudinal direction of the optical fiber ribbon 1C. Further, when the non-connected portions 24 are formed, the optical fibers 11A to 11L are also arranged such that the distance P between the centers of adjacent optical fibers is 220 µm or more and 280 µm or less.

As described above, according to the optical fiber ribbon 1C of the second modification, since the non-connected portions 24 are intermittently formed in the longitudinal direction of the optical fiber ribbon 1C, deformability of the optical fiber ribbon 1C is enhanced in the cross section perpendicular to the longitudinal direction. Since the optical fiber ribbon 1C is easily deformed, a plurality of optical fiber ribbons 1C can be mounted in the optical fiber cable at a high density.

Although the outer diameters of the optical fibers 11 of the optical fiber ribbon 1C according to the second modification are all the same, the optical fibers 11 of the optical fiber ribbon 1C may have different outer diameters D1 and D2 as shown in the first modification.

(Third Modification)

Figure 7:
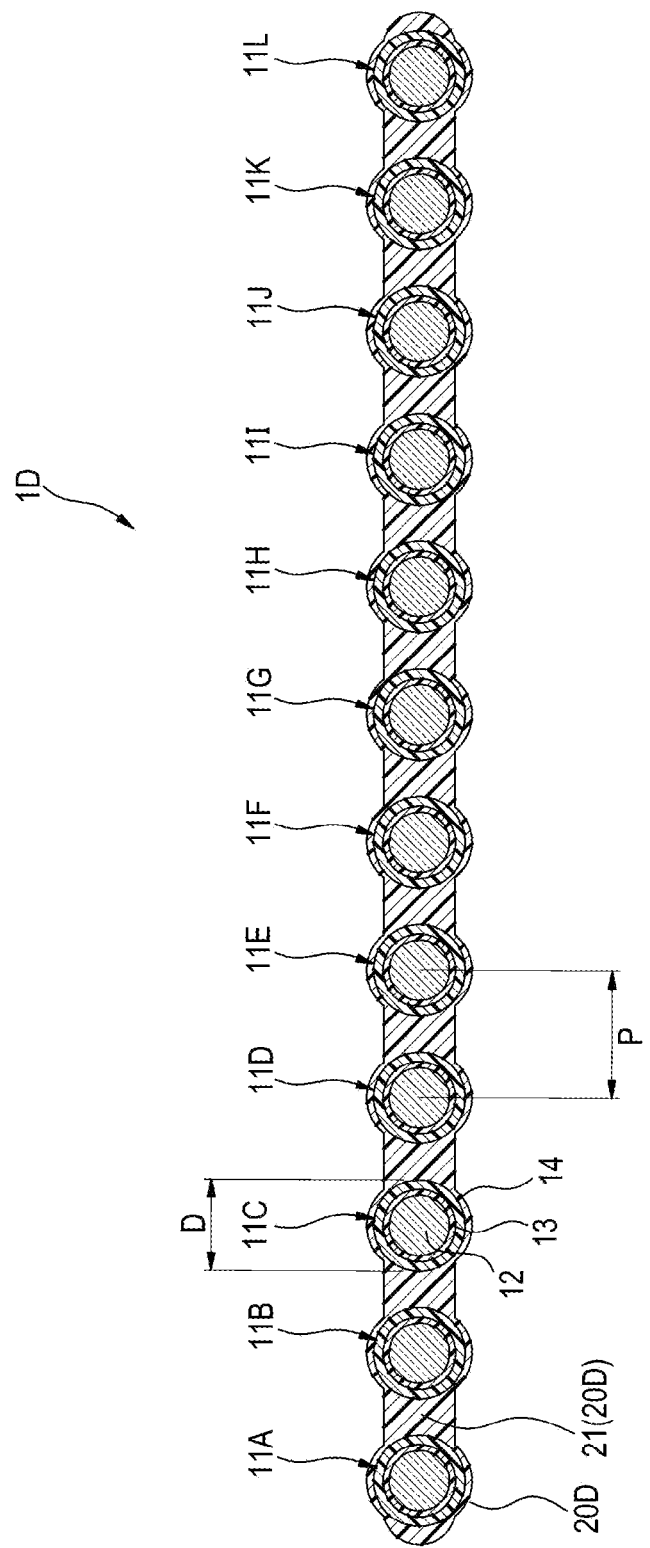
FIG. 7 is a cross-sectional view of an optical fiber ribbon according to a third modification.
Figure 8:
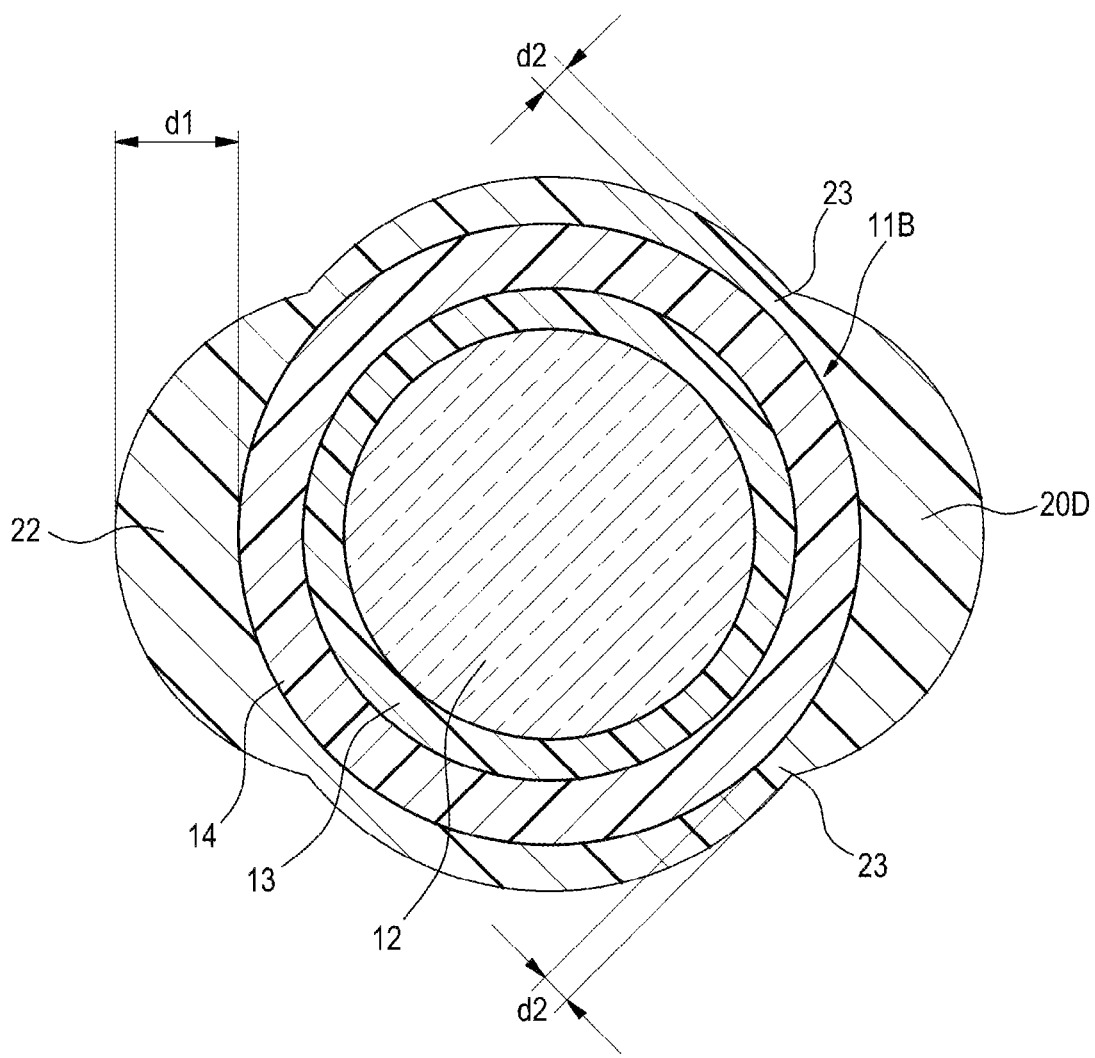
FIG. 8 is a cross-sectional view of an optical fiber of the optical fiber ribbon shown in FIG. 7.

In the optical fiber ribbon 1A according to the first embodiment, a thickness of the collective coating 20 is uniform on the outer periphery of each of the optical fibers 11, but the thickness of the collective coating 20 may not be uniform. FIG. 7 is a cross-sectional view perpendicular to a longitudinal direction of an optical fiber ribbon 1D according to a third modification. FIG. 8 is a cross-sectional view of one optical fiber 11B among the plurality of optical fibers 11 included in the optical fiber ribbon 1D shown in FIG. 7. In the description of FIGS. 7 and 8, elements substantially the same as or corresponding to those in the configurations shown in FIGS. 1 and 2 are denoted by the same reference numerals, and repeated description thereof will be omitted.

As shown in FIGS. 7 and 8, in the cross-sectional view of the optical fiber 11B, a collective coating 20D includes a thick portion 22 and at least two thin portions 23. In other words, a thickness of the collective coating 20D in the third modification is non-uniform on the outer periphery of the optical fiber 11B. Here, the thickness of the collective coating 20D on the outer periphery of the optical fiber 11B is measured at a total of five locations except for the connected portion 21. Among the five locations, a portion around a location where the thickness of the collective coating 20D is largest is defined as the thick portion 22, and a portion around a location where the thickness of the collective coating 20D is thinner than the thick portion 22 by 5 µm or more is defined as the thin portion 23. Positions of the thick portion 22 and the thin portion 23 on the outer periphery of the optical fiber 11B shown in FIG. 8 are merely examples, and the present disclosure is not limited thereto. Further, since the collective coating 20D covers the entire outer periphery of the optical fiber 11B, there is no location where the optical fiber 11B is exposed from the collective coating 20D.

A thickness d2 of the collective coating 20D in the thin portion 23 is smaller than a thickness d1 of the collective coating 20D in the thick portion 22. Specifically, a difference between the thickness d1 of the collective coating 20D in the thick portion 22 and the thickness d2 of the collective coating 20D in the thin portion 23 is 5 µm or more and 19 µm or less. The thickness d1 of the collective coating 20D in the thick portion 22 is, for example, 20 µm or less. The thickness d2 of the collective coating 20D in the thin portion 23 is, for example, 11 µm or more and 15 µm or less. The thickness of the collective coating between the optical fiber 11B and the optical fiber 11A or 11C refers to a thickness from a middle point of the connected portion 21 to the optical fiber 11B.

As described above, in the optical fiber ribbon 1D according to the third modification, the collective coating 20D includes the thick portion 22 and at least two thin portions 23, and the thickness of the collective coating 20D is non-uniform. In particular, since the difference between the thickness d1 of the collective coating 20D in the thick portion 22 and the thickness d2 of the collective coating 20D in the thin portion 23 is as relatively large as 5 µm or more and 19 µm or less, even when a plurality of optical fiber ribbons 1D are mounted in an optical fiber cable at a high density, a contact area between the optical fibers in adjacent optical fiber ribbons 1D and a contact area between the optical fiber ribbons can be reduced. Accordingly, friction is less likely to occur between adjacent optical fiber ribbons, cable meandering can be prevented, and cable laying work can be improved.

Further, when the optical fiber ribbon 1D is mounted in an optical fiber cable, the thick portion 22 of each optical fiber may be disposed at a position facing the thin portion 23 of another optical fiber. Accordingly, as compared with a case where the collective coating has a uniform thickness, a mounting density of the optical fiber 11 with respect to the optical fiber cable is higher in a case where the thick portion 22 and the thin portion 23 are provided.

(First Evaluation Experiment)

Figure 9:
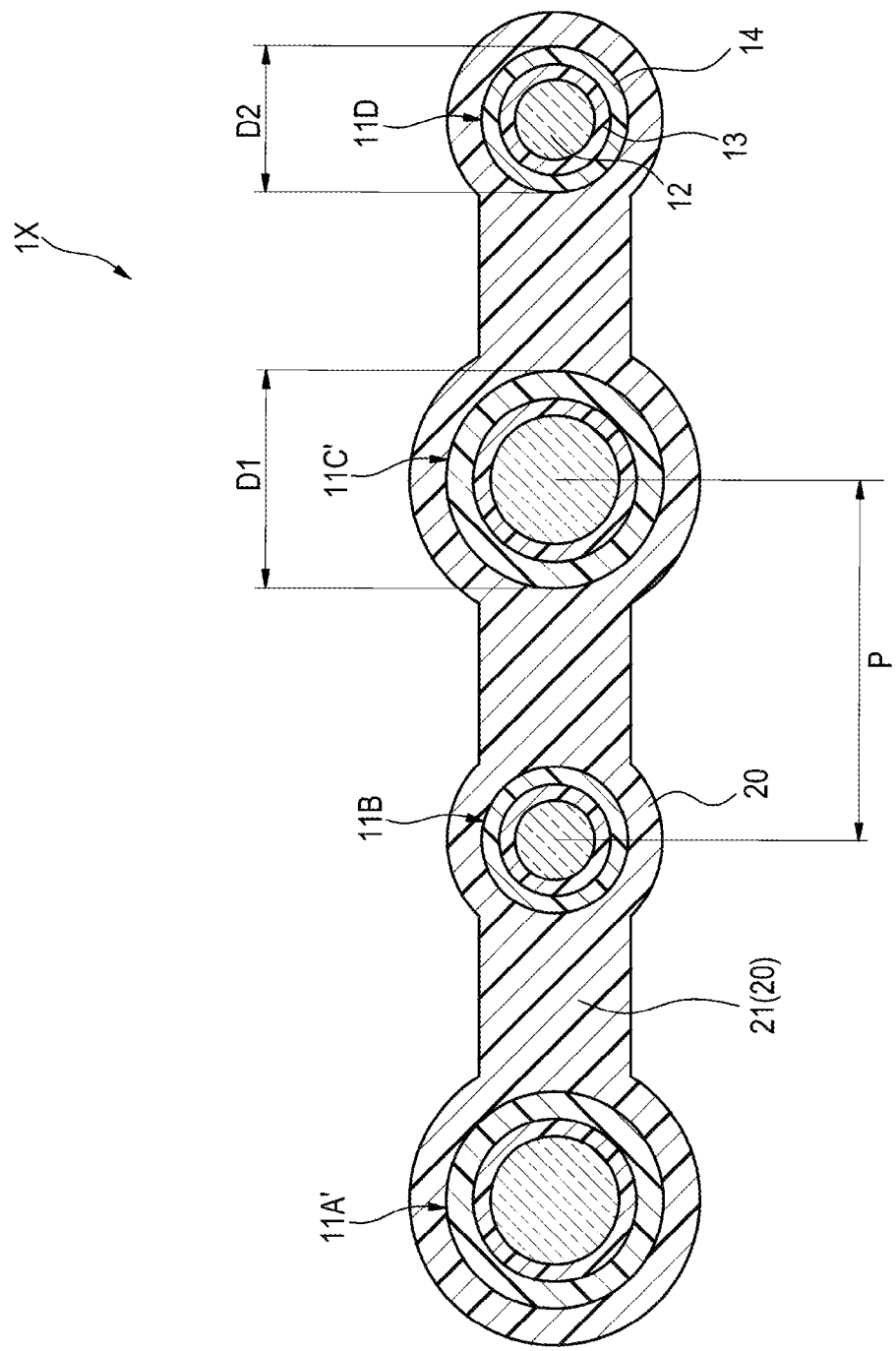
FIG. 9 is a cross-sectional view of an optical fiber ribbon used in an evaluation experiment.

The dynamic friction force and the surface hardness of the optical fiber ribbon of the present disclosure were evaluated. FIG. 9 is a cross-sectional view perpendicular to a longitudinal direction of an optical fiber ribbon 1X used in a first evaluation experiment. In the description of FIG. 9, elements substantially the same as or corresponding to those in the configuration shown in FIG. 4 are denoted by the same reference numerals, and repeated description thereof will be omitted.

As shown in FIG. 9, the optical fiber ribbon 1X used in the first evaluation experiment includes four optical fibers 11A', 11B, 11C', and 11D. Each of the optical fibers includes the glass fiber 12, the primary resin layer 13, and the secondary resin layer 14. The outer diameter D1 of each of the optical fibers 11A' and 11C' is 200 μm. The outer diameter D2 of each of the optical fibers 11B and 11C is 180 μm. In other words, the optical fiber having the outer diameter D1 of 200 μm and the optical fiber having the outer diameter D2 of 180 μm are alternately arranged along a direction orthogonal to the longitudinal direction of the optical fiber ribbon 1X. A distance between centers of adjacent optical fibers 11 is 255 μm.

In a manufacturing process of the optical fiber ribbon 1X, outer peripheries of the four optical fibers 11A' to 11D arranged in parallel are coated with an ultraviolet curable resin. Thereafter, the ultraviolet curable resin is cured by being irradiated with ultraviolet rays, and the collective coating 20 is formed. At this time, the outer peripheries of the optical fibers 11A' to 11D are covered with the collective coating 20. The dynamic friction force and the surface hardness of the collective coating 20 vary depending on a composition of the applied ultraviolet curable resin. The ultraviolet curable resin is cured, and the connected portions 21 are formed between all adjacent optical fibers. In the optical fiber ribbon 1X, the thickness of the collective coating 20 is from 5 μm to 20 μm.

In the first evaluation experiment, samples No. 1 to No. 5 for the optical fiber ribbon 1X having various dynamic friction forces or surface hardnesses were prepared by adjusting the composition of the applied ultraviolet curable resin. Further, samples No. 6 to No. 7 were prepared as comparative examples. In the first evaluation experiment, the dynamic friction force, the surface hardness, and low-temperature characteristics of the optical fiber ribbon 1X were evaluated.

Figure 10:
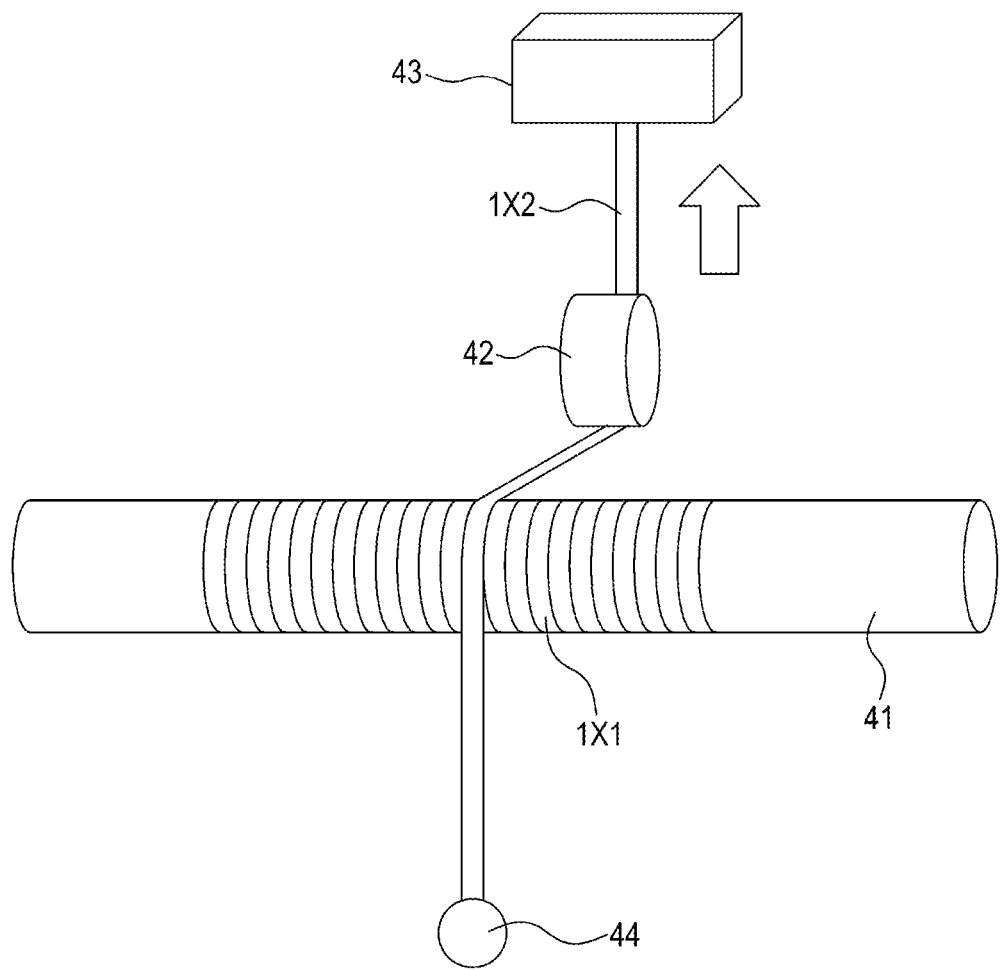
FIG. 10 is a schematic diagram of an experiment for measuring a dynamic friction force used in the evaluation experiment.

FIG. 10 is a schematic diagram of an experiment for measuring the dynamic friction force used in the first evaluation experiment. As shown in FIG. 10, first, an optical fiber ribbon 1X1 to be measured is wound around an outer periphery of a mandrel 41 having an outer diameter of 10 mm. Further, another optical fiber ribbon 1X2 to be measured is arranged to be brought into contact with the optical fiber ribbon 1X1, which is wound around the mandrel 41, from above the mandrel 41 via a roller 42. A pulling machine 43 is disposed at one end (upper side in FIG. 10) of the optical fiber ribbon 1X2, and a weight 44 is disposed at the other end (lower side in FIG. 10) of the optical fiber ribbon 1X2. The optical fiber ribbon 1X2 extending from the roller 42 to the mandrel 41 is bent at 90 degrees with respect to the optical fiber ribbon 1X2 extending from the pulling machine 43 to the roller 42. The optical fiber ribbon 1X2 extending from the mandrel 41 to the weight 44 is bent at 90 degrees with respect to the optical fiber ribbon 1X2 extending from the roller 42 to the mandrel 41. A detector provided inside the pulling machine 43 measured tension of the optical fiber ribbon 1X2 and defined the measured tension as the dynamic friction force. A measurement temperature was 23° C. A dynamic friction coefficient μ can be determined by a method described in JPH06-265737A.

In the first evaluation experiment, a weight of the weight 44 is 10 g. In this state, the pulling machine 43 pulls the optical fiber ribbon 1X2 in a certain direction (upward in FIG. 10) at a speed of 500 mm/min, and the detector provided inside the pulling machine 43 measures tension as a dynamic friction force of the optical fiber ribbon 1X2.

Further, in the measurement of the optical fiber ribbon 1X, a composite modulus in a depth direction was determined by a test method based on ISO14577 using HYSITRON TI950 TriboIndenter manufactured by BRUKER. In the first evaluation experiment, the composite modulus refers to the surface hardness. An indentation depth was set to 100 nm, and the measurement was performed using a Berkovich indenter. Further, in the first evaluation experiment, the low-temperature characteristics of the optical fiber ribbon 1X were evaluated. Here, the low-temperature characteristics were evaluated by measuring an attenuation amount per unit distance in a case where light having a wavelength of 1.55 μm was incident on the optical fiber 11A' inside the cable under an environment of 23° C. and an environment of −30° C., and evaluating a difference between measured values under the two temperature environments. Evaluation results are shown in Table 1.

TABLE 1

| | Sample | | | | | | |
|---|---|---|---|---|---|---|---|
| | No. 1 | No. 2 | No. 3 | No. 4 | No. 5 | No. 6 | No. 7 |
| Dynamic friction force (N) | 0.3 | 0.3 | 0.1 | 0.03 | 0.1 | 0.5 | 1 |
| Surface hardness (GPa) | 1.2 | 2.3 | 1.2 | 1.2 | 3 | 1.2 | 1 |
| Low-temperature characteristics | Exceed 0.1 dB/km and 0.3 dB/km or less | 0.1 dB/km or less | Exceed 0.1 dB/km and 0.3 dB/km or less | 0.1 dB/km or less | 0.1 dB/km or less | Exceed 0.3 dB/km | Exceed 0.3 dB/km |

As shown in Table 1, the low-temperature characteristics of the samples No. 1 to No. 5 were all 0.3 dB/km or less, and it was confirmed that a cable attenuation was small. On the other hand, the low-temperature characteristics of the samples No. 6 and No. 7 both exceeded 0.3 dB/km. In particular, although the surface hardness of the sample No. 1 and the surface hardness of the sample No. 6 are 1.2 GPa, the sample No. 1 has better low-temperature characteristics than the sample No. 6. From the above, it was confirmed that the optical fiber ribbon 1X having low cable attenuation characteristics can be implemented when the dynamic friction force is 0.3 N or less. Further, since the low-temperature characteristics of the samples No. 1 to No. 5 are all relatively excellent, it was confirmed that the optical fiber ribbon 1X having low cable attenuation characteristics can be implemented when the surface hardness is 1.2 GPa or more and 3 GPa or less.

(Second Evaluation Experiment)

Figure 11:
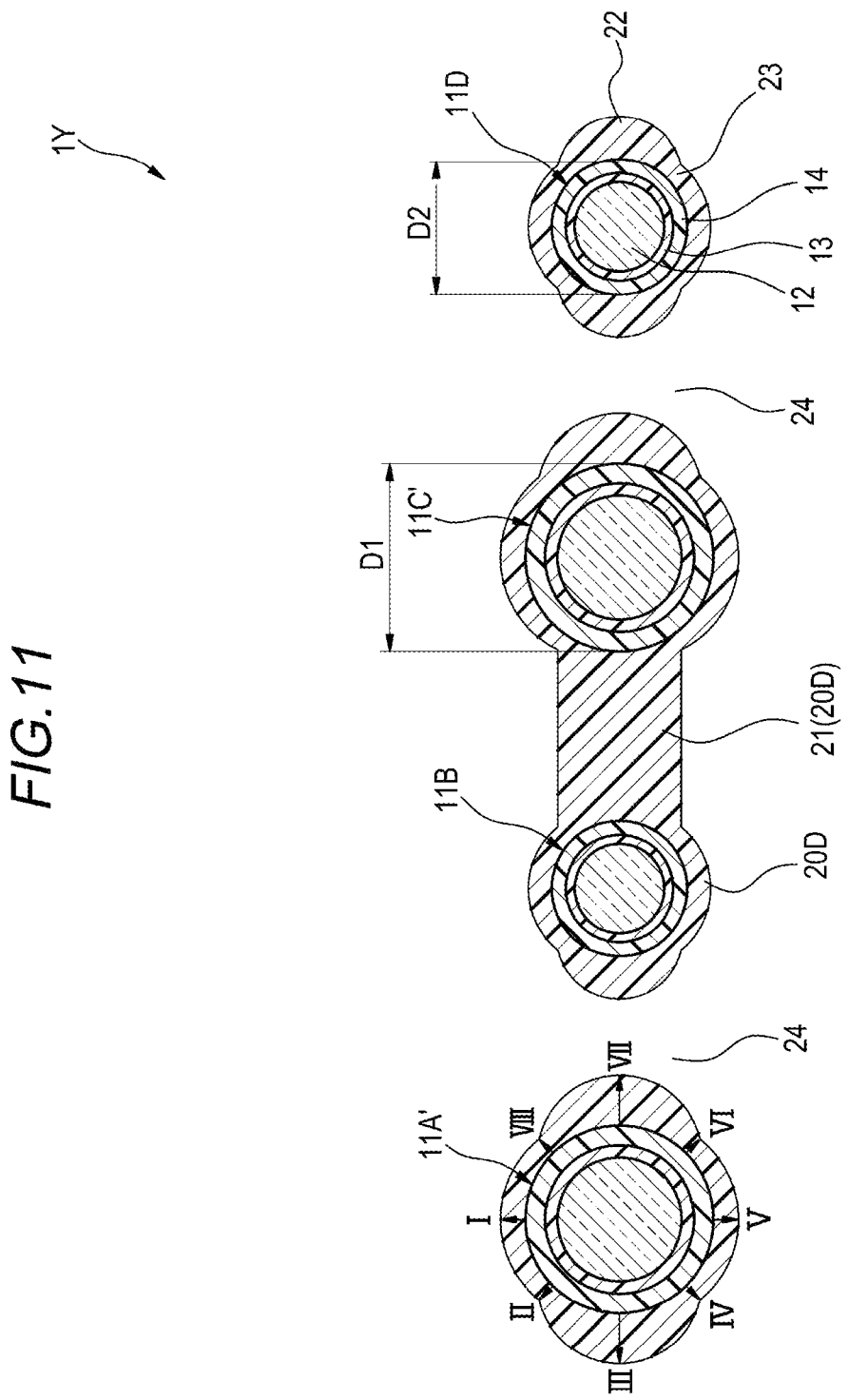
FIG. 11 is a cross-sectional view of an optical fiber ribbon used in an evaluation experiment.

The low-temperature characteristics and the presence or absence of single core-separation of the optical fiber ribbon of the present disclosure were evaluated. FIG. 11 is a cross-sectional view perpendicular to a longitudinal direction of an optical fiber ribbon 1Y used in a second evaluation experiment. In the description of FIG. 11, elements substantially the same as or corresponding to those in the configuration shown in FIG. 9 are denoted by the same reference numerals, and repeated description thereof will be omitted.

As shown in FIG. 11, the optical fiber ribbon 1Y used in the second evaluation experiment includes the non-connected portions 24. In a manufacturing process of the optical fiber ribbon 1Y, outer peripheries of the four optical fibers 11A' to 11D arranged in parallel are coated with an ultraviolet curable resin. Thereafter, the ultraviolet curable resin is cured by being irradiated with ultraviolet rays, and the collective coating 20D is formed. At this time, the outer peripheries of the optical fibers 11A' to 11D are covered with the collective coating 20D. The thick portion 22 and the thin portion 23 are formed by adjusting a thickness of the applied ultraviolet curable resin by a shape of a die or the like. Further, after the ultraviolet curable resin is cured and the connected portions 21 are formed between all the adjacent optical fibers, the non-connected portions 24 are formed by inserting a cleaving blade such as a cutter between the adjacent optical fibers 11A' and 11B and between the adjacent optical fibers 11C' and 11D intermittently in the longitudinal direction of the optical fiber ribbon 1Y. The connected portion 21 remains between the optical fibers 11B and 11C' where no cleaving blade is inserted.

In the second evaluation experiment, samples No. 1 to No. 3 for the optical fiber ribbon 1Y having various thicknesses of the collective coating 20D were prepared by adjusting a thickness of the applied ultraviolet curable resin. Further, a sample No. 4 was prepared as a comparative example. In the second evaluation experiment, the optical fiber 11A' was selected as any optical fiber of each sample, and the thickness of the collective coating 20D was measured at any eight measurement positions I to VIII in the optical fiber 11A'. Further, the optical fiber ribbon 1Y was mounted in an optical fiber cable, and cable attenuation characteristics were evaluated as low-temperature characteristics of the optical fiber ribbon 1Y. An evaluation method for the cable attenuation characteristics is the same as the evaluation method in the first evaluation experiment. Further, the optical fiber ribbon 1Y was taken out from the optical fiber cable, and the presence or absence of single core-separation of the optical fiber was examined. Evaluation results are shown in Table 2.

TABLE 2

|  |  | Sample | | | |
|---|---|---|---|---|---|
|  |  | No. 1 | No. 2 | No. 3 | No. 4 |
| Thickness of collective coating (μm) | I | 20 | 20 | 20 | 20 |
|  | II | 15 | 1 | 1 | 0 |
|  | III | 20 | 20 | 20 | 20 |
|  | IV | 15 | 1 | 1 | 0 |
|  | V | 20 | 20 | 20 | 20 |
|  | VI | 20 | 20 | 1 | 20 |
|  | VII | 20 | 20 | 20 | 20 |
|  | VIII | 20 | 20 | 20 | 20 |
| Low-temperature characteristics |  | 0.3 dB/km | 0.27 dB/km | 0.25 dB/km | 0.25 dB/km |
| Presence or absence of optical fiber-separation |  | NO | NO | NO | YES |

As shown in Table 2, in the samples No. 1 to No. 3, the optical fiber separation of the optical fiber ribbon 1Y was not found. On the other hand, in the sample No. 4 as the comparative example, the optical fiber separation of the optical fiber ribbon 1Y was found. The sample No. 4 has two portions where the thickness of the collective coating 20D is zero at the measurement positions II and IV. Portions at which the optical fiber 11A' is not covered with the collective coating 20D and is exposed from the collective coating 20D are at the measurement positions II and IV. It was confirmed that the collective coating 20D was peeled off from the optical fiber 11A' starting from the exposed portion, and as a result, the optical fiber 11A' was separated from the optical fiber ribbon 1Y. From the above, it was confirmed that when the outer peripheries of the plurality of optical fibers 11 were covered with the collective coating 20D, there was no fiber-separation.

In the sample No. 2, the measurement positions I, III, and V to VIII correspond to the thick portion 22, and the thickness of the collective coating 20D at each measurement position is 20 μm. In the sample No. 4, the measurement positions II and IV correspond to the thin portion 23, and the thickness of the collective coating 20D at each measurement position is 1 μm. It was confirmed that the cable attenuation in the sample No. 2 is 0.27 dB/km. Further, in the sample No. 3, the measurement positions I, III, V, VII, and VIII correspond to the thick portion 22, and the thickness of the collective coating 20D at each measurement position is 20 μm. In the sample No. 3, the measurement positions II, IV and VI correspond to the thin portion 23, and the thickness of collective coating 20D at each measurement position is 1 μm. It was confirmed that the cable attenuation in the sample No. 3 is 0.25 dB/km. From the above, it was confirmed that the optical fiber ribbon 1Y having low cable attenuation can be implemented when the difference between the thickness of the collective coating 20D in the thick portion 22 and the thickness of the collective coating 20D in the thin portion 23 is 19 μm or less.

As shown in Table 2, it was confirmed that the cable attenuation in the sample No. 1 was 0.3 dB/km. In the sample No. 1, the measurement positions I, III, and V to VIII correspond to the thick portion 22, and the measurement position II and IV correspond to the thin portion 23. In the sample No. 1, the thickness of the collective coating 20D in the thick portion 22 is 20 μm, and the thickness of the collective coating 20D in the thin portion 23 is 15 μm. From the above, it was confirmed that the optical fiber ribbon 1Y having low cable attenuation can be implemented when the difference between the thickness of the collective coating 20D in the thick portion 22 and the thickness of the collective coating 20D in the thin portion 23 is 5 μm or more.

As shown in the sample Nos. 1 to 3 in Table 2, it was confirmed that the smaller the thickness of the collective coating 20D in the thin portion 23 is and the larger the number of thin portions 23 is, the better the low-temperature characteristics are. This is considered to be because the number of contact points between the optical fiber ribbons is reduced when the thin portions 23 are formed.

Although the present disclosure has been described in detail with reference to specific embodiments, it will be apparent to those skilled in the art that various changes and modifications can be made without departing from the spirit and scope of the present disclosure. The numbers, positions, shapes or the like of components described above are not limited to the above embodiment, and can be changed to suitable numbers, positions, shapes or the like during carrying out the present disclosure.

REFERENCE SIGNS LIST 1A, 1B, 1C, 1X, 1X1, 1X2, 1Y: optical fiber ribbon
11, 11A to 11L: optical fiber
12: glass fiber
13: primary resin layer
14: secondary resin layer
20D: collective coating
21: connected portion
22: thick portion
23: thin portion
24: non-connected portion
30 V-groove base
31, 31A to 31L: V-groove
41: mandrel
42: roller
43: pulling machine
44: weight
D, D1, D2: outer diameter of optical fiber
P: distance between centers of adjacent optical fibers
P0: V-groove pitch
d1: thickness of collective coating in thick portion
d2: thickness of collective coating in thin portion

What is claimed is:

1. An optical fiber ribbon comprising:
a plurality of optical fibers arranged in parallel in a direction orthogonal to a longitudinal direction of the optical fibers; and
a collective coating covering outer peripheries of the plurality of optical fibers, wherein
the collective coating includes a connected portion at which the optical fibers adjacent to each other are connected in at least a part of the plurality of optical fibers,
an outer diameter of each of the plurality of optical fibers is 215 μm or less, and
a dynamic friction force of the collective coating is 0.3 N or less, wherein
a surface hardness of the collective coating is 1.2 GPa or more and 3 GPa or less.

2. The optical fiber ribbon according to claim 1, wherein a distance between centers of the optical fibers adjacent to each other is 220 μm or more and 280 μm or less.

3. The optical fiber ribbon according to claim 1, wherein the collective coating includes a non-connected portion at which the optical fibers adjacent to each other are not connected in at least a part of the plurality of optical fibers, and
the connected portion is intermittently formed in the longitudinal direction.

4. The optical fiber ribbon according to claim 1, wherein in a cross-sectional view of each of the optical fibers, the collective coating includes a thick portion and at least two thin portions in each of which a thickness of the collective coating is smaller than the thickness of the collective coating in the thick portion, and
a difference between the thickness of the collective coating in the thick portion and the thickness of the collective coating in each of the thin portions is 5 μm or more and 19 μm or less.

5. The optical fiber ribbon according to claim 1, wherein the plurality of optical fibers include a first optical fiber having a first outer diameter and a second optical fiber having a second outer diameter.

* * * * *